Figure 1:
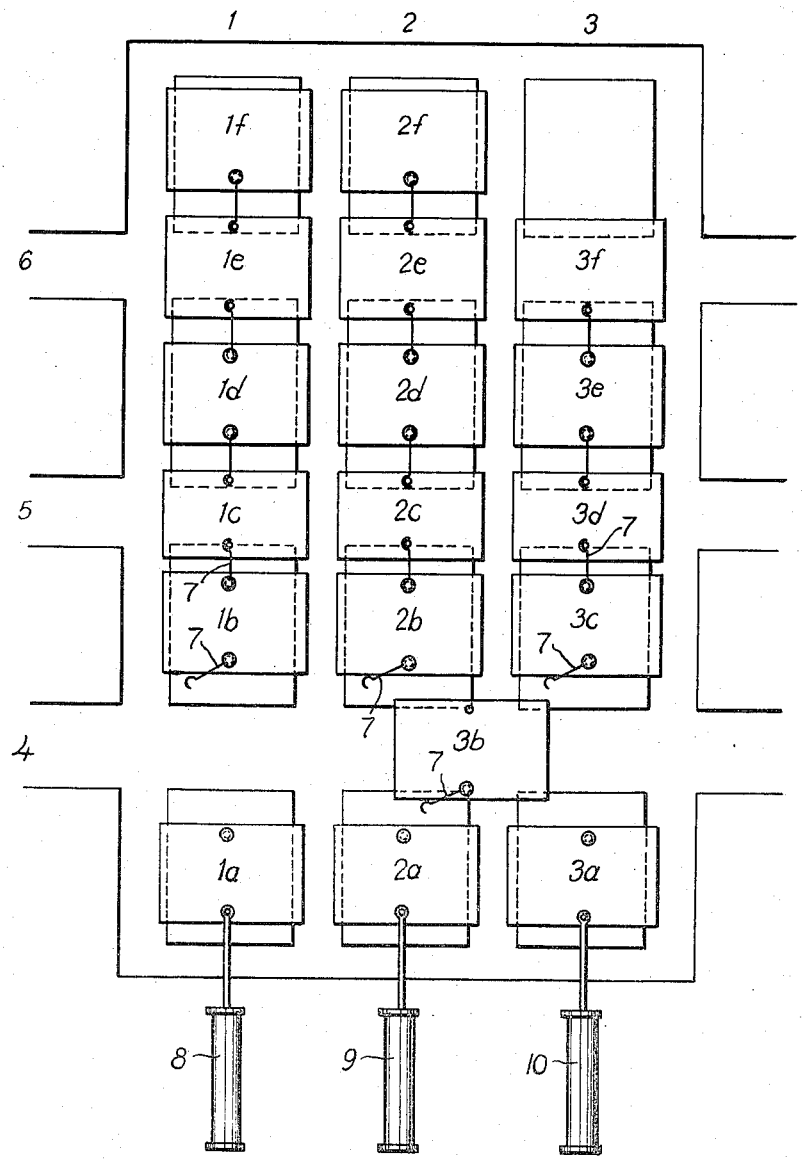

Feb. 9, 1960   J. O. ISVÉN   2,924,343
CONVEYING SEPARATE STORAGE UNITS INTO AND FROM AN AREA
Filed Sept. 23, 1957   2 Sheets-Sheet 2
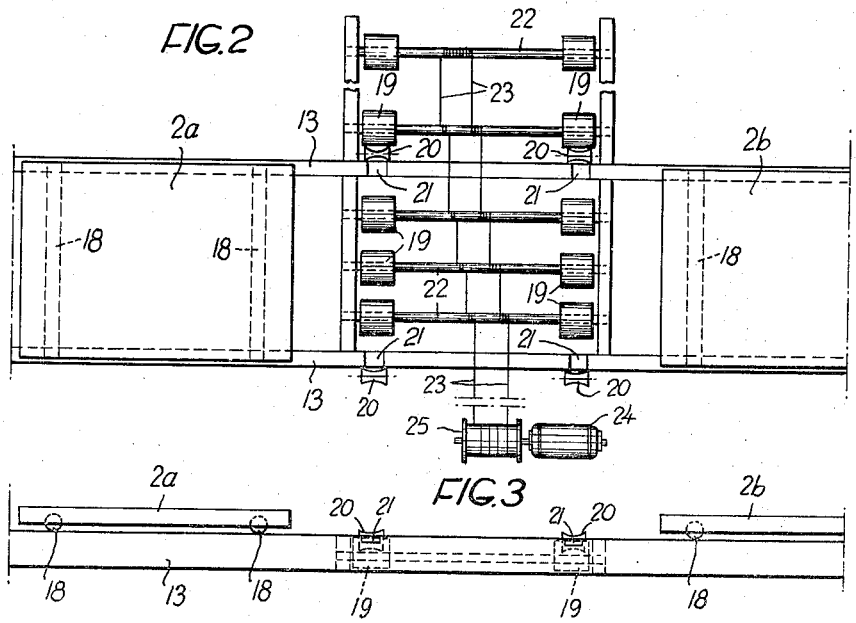
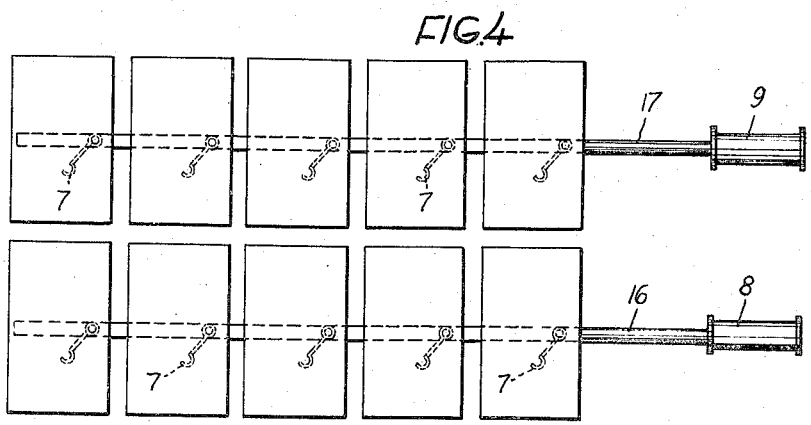

United States Patent Office 2,924,343
Patented Feb. 9, 1960

2,924,343

CONVEYING SEPARATE STORAGE UNITS INTO AND FROM AN AREA

John Olof Isvén, Danderyd, Sweden

Application September 23, 1957, Serial No. 685,534

Claims priority, application Sweden October 5, 1956

2 Claims. (Cl. 214—16)

The present invention refers to an arrangement for conveying separate storage units into and from an area and intended for the keeping of objects of varying kinds such as motorcars.

The invention has for its purpose to provide storing facilities of varying kinds in a number of separate units within a certain limited area, in a manner such that said area will be utilized in the best possible manner without at the same time impairing the accessibility of the objects.

The invention is particularly suitable for the storing of goods and the like in storage localities or for the garaging of motor cars that are kept on platforms or in boxes, the floor surface of which is then utilized to the greatest possible extent.

The invention is principally distinguished by the feature that the storage units are arranged in rows crossing one another at rignt angles and displaceable in the direction of the rows on runways extending substantially at the same level, said storage units being provided on the lower side thereof with carrying planes, wheels or rollers arranged in a crosswise fasnion over the direction of the rows, which runways are constituted in the one direction of rows by longitudinally extending rails, in which the storage units may slide or roll, and which runways are constituted by stationary rollers in the other direction transverse to the rails, which is used for the conveyance of the storage units onto and from the area in consideration.

A suitable form of embodiment will be described hereinbelow as an exemplifying construction of the invention in connection with the annexed drawings, which in Fig. 1 diagrammatically illustrates an installation for eighteen storage units arranged in three parallel spaced rows and with three parallel spaced entering runways constituted by tracks as shown in Fig. 2 and three parallel spaced outgoing runways constituted by parallel spaced rows of stationary rollers arranged transversely to the tracks. Fig. 2 shows a construction of the mutually perpendicular rows of rollers and tracks viewed from above, Fig. 3 shows the same arrangement as that of Fig. 2, viewed from the side, and Fig. 4 shows diagrammatically, viewed from above, an embodiment of a coupling and displacing contrivance.

In the installation shown schematically in Fig. 1, the storage units are shown in the form of equally dimensioned square platforms 1a–1f, 2a–2f and 3a–3f, as illustrated within a restricted area, the platforms 1a–1f being arranged in a row behind one another, while the platforms 3a–3f are arranged in a third row beside the second row. The platforms are arranged displaceable in two directions at right angles to each other, namely, in the respective directions of rows on three parallel spaced runways denoted by 1, 2 and 3, respectively, and on three other parallel spaced runways 4, 5 and 6 at right angles to the runways 1–3, which are arranged at mutual spaces equalling substantially the dimension in the direction of rows of one platform. The platforms are provided with cut-off coupling members 7, shown in the figures in the form of hooks, by means of which the platforms in each row may be coupled to a displaceable train of carriages. The connecting members 7 may also, according to the embodiment shown in Fig. 4 be arranged in one or more rods 16 and 17 extending underneath the platforms along each row. Here, platforms are coupled together in a row by the same being coupled in desired numbers to the rod extending underneath the platforms. The coupling members may be manually operable or be caused by means of remotely controlled means to be brought into or out of engagement with the desired number of platforms. Here, the connection of the platforms in a row is independent of whether any of the platforms are occasionally removed. The coupling members 7 may be of any suitable construction; for example, the coupling members may be constituted by mechanical, pneumatic, hydraulic or electric means or by automatically operable couplings. The displacement of the platforms on the various runways 1, 2 and 3 may preferably be performed by means of a servomotor 8, 9 and 10, respectively, arranged in the end of each row of platforms, said servomotor being adapted to displace the platforms in the row back and forth for a distance somewhat longer than the dimension of the platform in the direction of rows. By disconnecting the coupling members 7 on both sides of a platform, the latter may be released, and if located in the first row, i.e. runway 1 in a position in front of one of the runways 4, 5 or 6 at right angles to the direction of rows, it may be moved out on any one of these runways. If it is desired to move out a platform in the first row, i.e. at runway 1, which is not in front of an outgoing runway, the platform will have to be moved to such a location by displacing the whole row by means of the appurtenant servomotor, whereupon the coupling members will have to be released for the platform in consideration to be moved out. If a platform in any row is required to be moved past i.e. cross another row in order to be moved out along the runways 4, 5 or 6, it is, of course, necessary to provide sufficient space at the cross points. This can be done by opening the rows to be crossed so as to establish the necessary pass-through gap. In Fig. 1, platform 3b is to be moved to the left and discharged along the runway 4. Consequently, the entire rows of platforms 1a–1f and 2a–2f are first displaced by their respective servo motors 8, 9 to the positions shown in Fig. 1, then platforms 1a and 2a are uncoupled from platforms 1b and 2b, and the former are then displaced in the opposite direction so as to establish the gaps necessary for passage of platform 3b to reach runway 4. The removal of platform 3b and any others through runways 4, 5 or 6 may be effected by suitable pulling or pushing members or by other means or by the fact that the transverse runways 4, 5 and 6 have such an inclination that the platform is caused to slide along the runway by its own weight. Friction reducing and controlling means may be arranged here to facilitate the transport, as will appear from Figs. 2 and 3.

In the embodiment shown in Figs. 2 and 3, the platforms are equipped with rollers 18 on the lower side thereof, such rollers extending transversely of and running with their ends on the sets of tracks 13 which constitute respectively the runways 1, 2 and 3. The transversely extending outgoing runways are constituted by rows of rollers 19, which are devoid of flanges and are located, all of them, with their upper tangential plane in the same plane as the upper sides of the sets of tracks 13. The rollers 19 are connected in pairs by transversely extending shafts 22 having smaller diameter than that of the rollers 19. A platform may thus be rolled ahead, so that the rollers 18 thereof are caused to roll right over the corresponding rollers 19 and are rolled away on the latter on an outgoing runway. For the guidance of the platforms in a lateral direction, circularly shaped hour-glass-like recessed guide rollers 20 may be made use of outside the tracks 13 in correspondence to the rollers 18, or, rollers may be provided which in a lateral direction bear on the side edges of the platforms. In the crossings between the tracks, the sets of tracks 13 are provided with recesses or depressions 21, in which the rollers 18 may pass without touching the sets of tracks 13. In order to displace the platforms by motor-power on the transverse runways for the conveyance of the storage units onto and from the area in consideration, the rollers 19 are driven by a wire-rope 23 from a motor 24. A few turns of the wire-rope 23 are wound upon each shaft 22 and the ends of the rope are secured to a drum 25 driven by the motor 24, at least such a length of the rope being wound onto the drum corresponding to the extension of the rolling track. The peripheral velocity of the drum 25 is adjusted to the desired peripheral velocity of the shafts 22.

The detachable coupling members 7 between the platforms may preferably also be operated by means of remotely controlled servomotors in the tracks underneath the platforms.

When a platform has been moved out of the area and the object has been removed from the platform, the latter is preferably brought immediately back to the area to be introduced into its place, whereupon all intervals are closed and all coupling members 7 between the platforms are coupled together, so that the whole platform system is in readiness for the removal of any platform. If the arrangement according to the invention is used for instance for garaging of motorcars, it will be found suitable to build the garage in a plurality of planes with lifts or elevators running up and down along the various planes. It may then be suitable to move out the platforms at one side of the installation and to move them in on the opposite side. It is then possible by means of a central operating system, for instance with push buttons for every platform, automatically to effect all movements required to move a platform out of the garage or into the same.

In the example of embodiment described, the storage units consist of platforms. It is also within the concept of the invention to make use of closed storage units in place of platforms, such as boxes for motor cars, to protect the objects kept therein from unauthorized persons and from dirtying as well as from atmospheric influences. It is also conceivable that the coupling members instead of being arranged on the various storage units are arranged on the actual objects, if they are suitable for this purpose. In place of rotating rollers, which are stationarily arranged in the runways, friction reducing means may also be provided in the storage units, for instance in the form of balls or rollers swingable about an axis perpendicular to the direction of movement, such rollers being adapted to roll on a plane substructure. In this case, only guidance in a lateral direction is required for the storage units.

What I claim is:

1. Improvement for conveying separate storage units into and out of an area and intended for the keeping of various objects, said storage units being arranged in parallel rows and displaceable in longitudinal and transverse directions on intersecting runways, the number of runways for moving the storage units into and out of the area being constituted by a runway for each second row at the most, said runways being substantially located on the same level, said storage units being provided with coupling means and being further provided on the lower side with rollers arranged transversely to the direction of said rows, said runways in the longitudinal direction being constituted by longitudinal extending rails on which said rollers roll, said runways in the transverse direction being constituted by rotatable rollers with stationary axis of rotation, said rollers of each transverse runway for moving the storage units into and out of the area being connected in spaced pairs by transversely extending elongated shafts having smaller diameter than that of the rollers, a common wire rope being wound at least one turn onto said shafts, the ends of the wire rope being secured to a motor driven drum, onto which is wound at least such a length of the wire rope as corresponds to the extension of the runway.

2. An arrangement according to claim 1, wherein the wire rope is wound from one end of the transverse runway from shaft to shaft to the other end of the transverse runway and from this end from shaft to shaft back to the first end of the transverse runway.

References Cited in the file of this patent

UNITED STATES PATENTS

| 1,243,777 | Strandh | Oct. 23, 1917 |
| 1,775,799 | Young | Sept. 16, 1930 |
| 1,888,004 | MacLeod | Nov. 15, 1932 |
| 2,718,317 | Strauss et al. | Sept. 20, 1955 |
| 2,762,515 | Ingold | Sept. 11, 1956 |

FOREIGN PATENTS

| 236,616 | Great Britain | July 2, 1925 |